United States Patent [19]

Stiller

[11] Patent Number: 5,401,355

[45] Date of Patent: Mar. 28, 1995

[54] APPARATUS FOR MANUFACTURING MULTIPLE COLORED PLIABLE SOFT TRIM COMPONENTS USING MOVABLE DIES

[76] Inventor: Larry B. Stiller, 8456 Smiley Ave., Shelby Township, Macomb County, Mich. 48316

[21] Appl. No.: 62,616

[22] Filed: May 11, 1993

[51] Int. Cl.⁶ .................... B29C 53/04; B30B 7/00
[52] U.S. Cl. .................... 156/443; 156/499; 156/507; 156/583.91
[58] Field of Search ............. 156/214, 285, 471, 473, 156/499, 507, 583.91, 443; 264/257; 425/500, 504, 508, 510, 513, 517–519, 520

[56] References Cited

U.S. PATENT DOCUMENTS

| | | | |
|---|---|---|---|
| 2,497,212 | 2/1950 | Donofrio | 425/519 |
| 2,523,525 | 9/1950 | Sachs | 156/443 |
| 3,186,812 | 6/1965 | Pfaender | 156/285 |
| 3,444,034 | 5/1969 | Hewett | 425/520 |
| 3,466,214 | 9/1969 | Polk et al. | 425/504 |
| 3,955,266 | 5/1976 | Honami et al. | |
| 4,275,030 | 6/1981 | Mares | |
| 4,278,629 | 7/1981 | Bennett | |
| 4,692,293 | 9/1987 | Gray | |
| 4,726,758 | 2/1988 | Sekine et al. | |
| 4,729,863 | 3/1988 | Müller et al. | |
| 4,744,741 | 5/1988 | Glover et al. | 425/123 |
| 4,840,760 | 6/1989 | Oishi | |
| 4,925,151 | 5/1990 | Gray | |
| 4,965,037 | 10/1990 | Weaver et al. | |
| 5,000,902 | 3/1991 | Adams | |
| 5,009,821 | 4/1991 | Weaver | |
| 5,044,919 | 9/1991 | Hama et al. | |
| 5,047,184 | 9/1991 | Busch et al. | |
| 5,128,090 | 7/1992 | Fujii et al. | 425/504 |
| 5,200,013 | 4/1993 | Traber | 156/443 |

*Primary Examiner*—Michael W. Ball
*Assistant Examiner*—Richard Crispino
*Attorney, Agent, or Firm*—Harness, Dickey & Pierce

[57] ABSTRACT

A vacuum forming mold has a plurality of dies with at least one die being movable with respect to the other dies. The die can be movable in a linear direction or they can be movable in both a linear and angular direction. A plurality of plastic sheets are heated and placed on a respective die with a vacuum being supplied through the dies to attract the plastic sheet. Once formed, the dies are moved together to create a seam bond between adjacent pieces of plastic sheets. Additional heating can be supplied to insure an adequate seam bond if required. In another embodiment, a single sheet of material composed of a plurality of sheets of material is used. The single sheet of material has a plurality of preseamed areas connecting each of the individual plastic sheets. These preseamed areas are positioned inbetween adjacent dies of the plurality of dies and the process continues as described above for the multiple sheets of material.

14 Claims, 10 Drawing Sheets

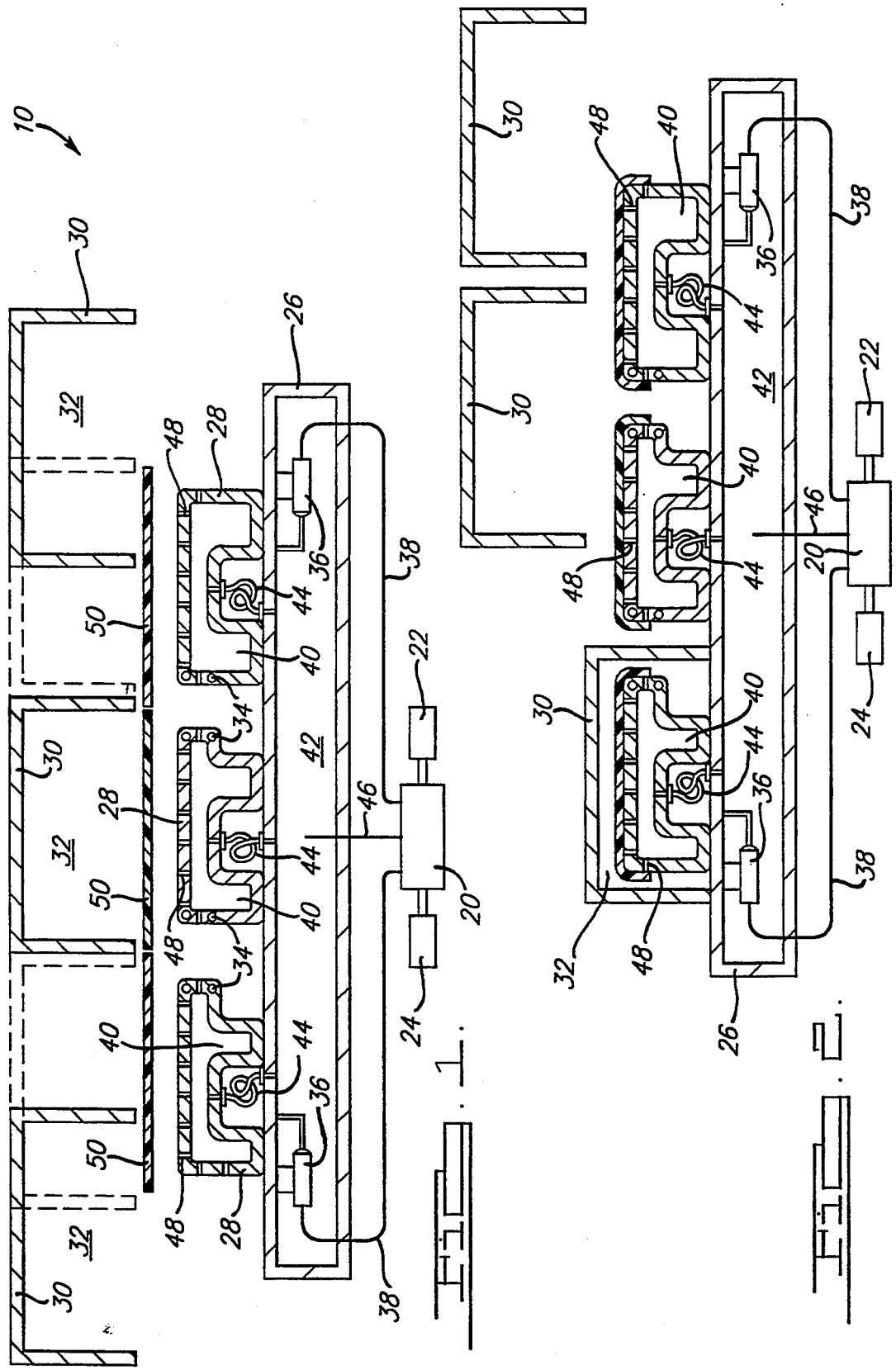

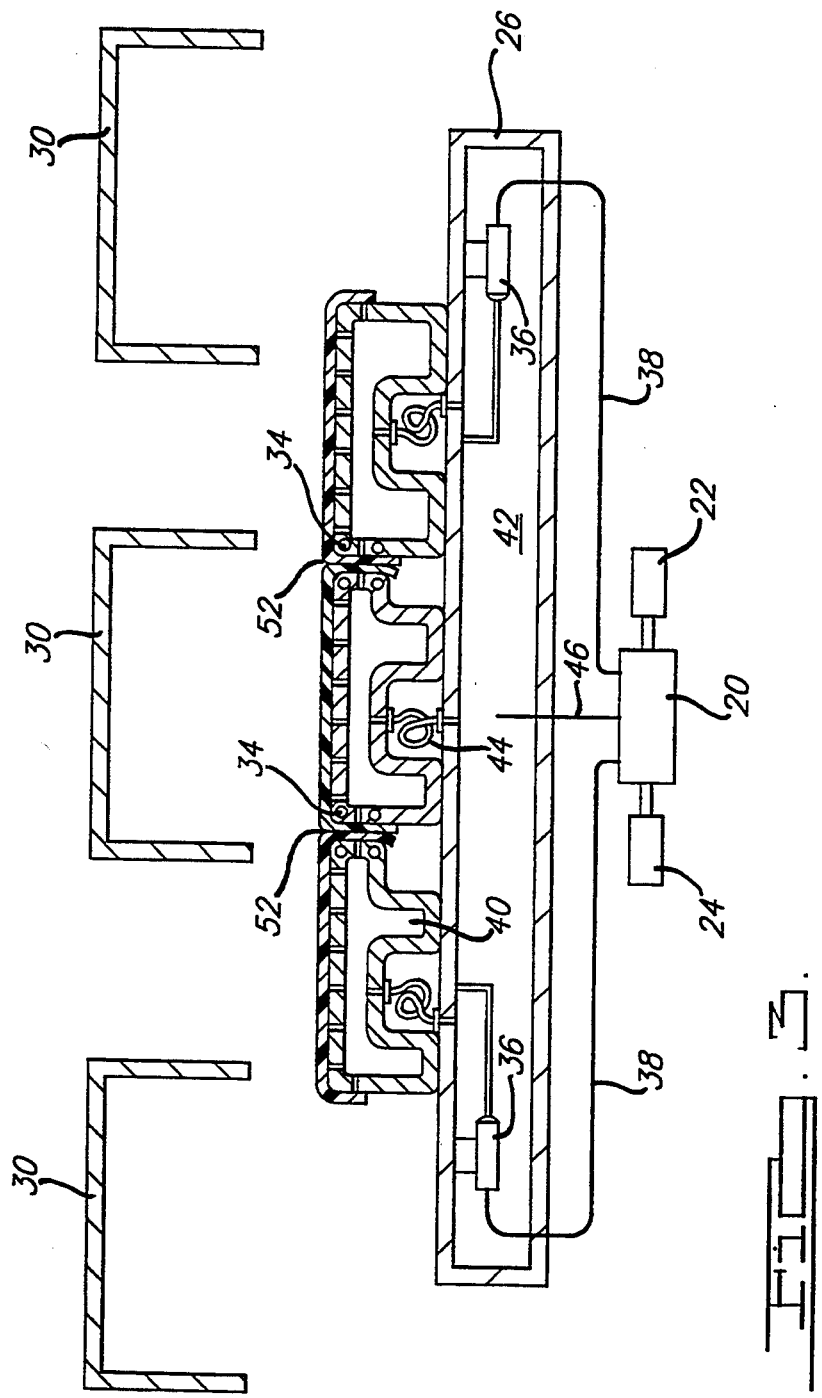

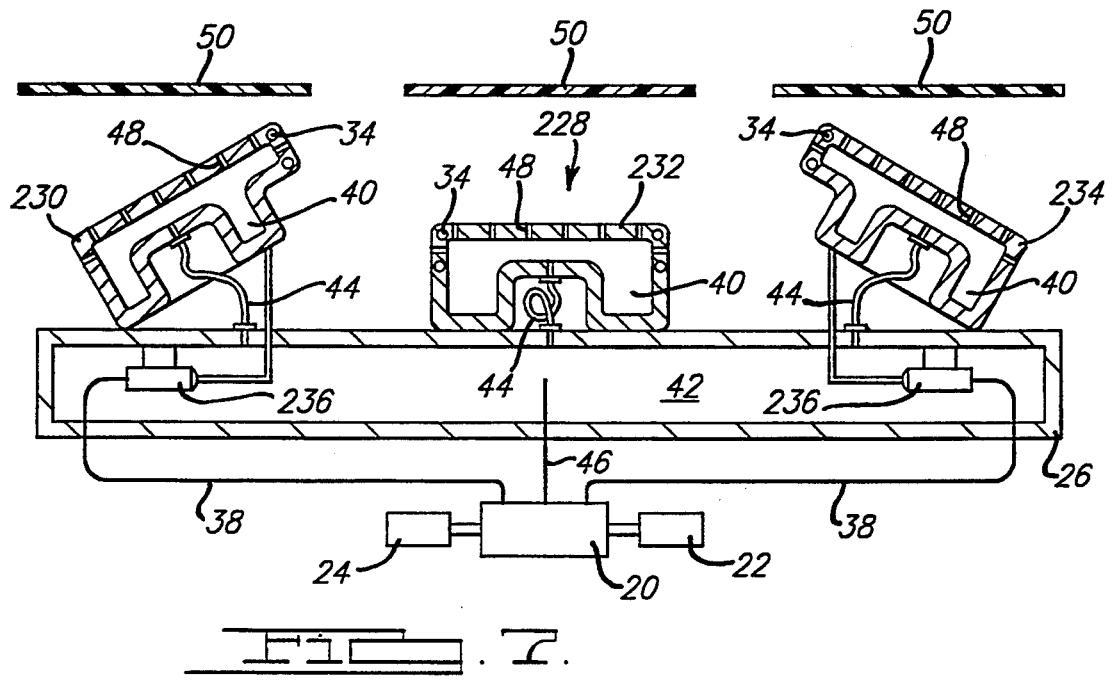
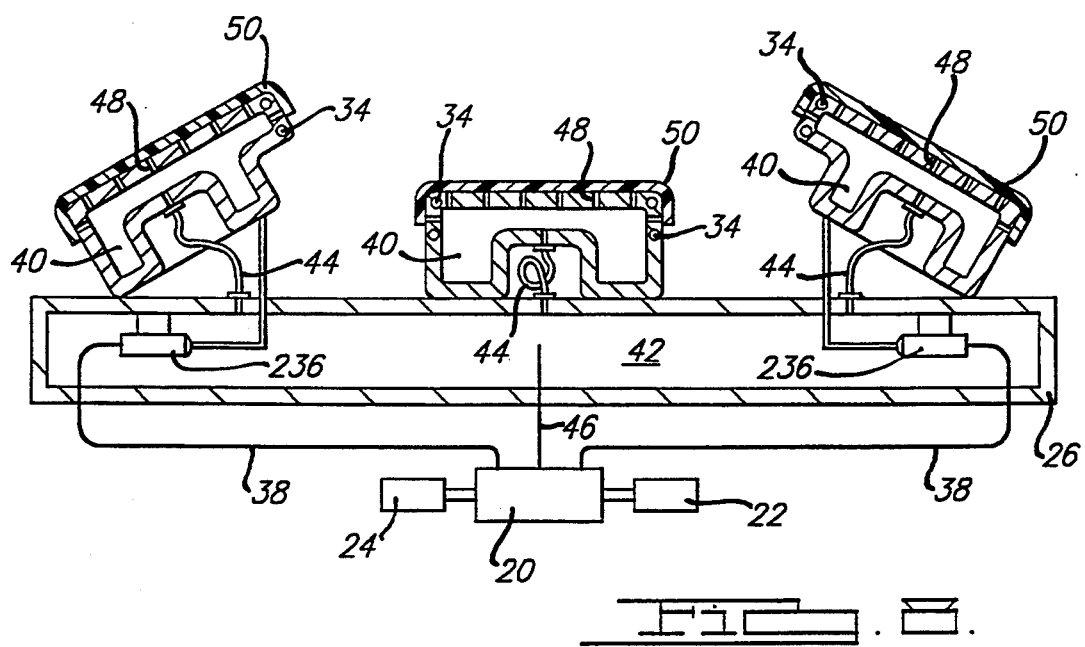

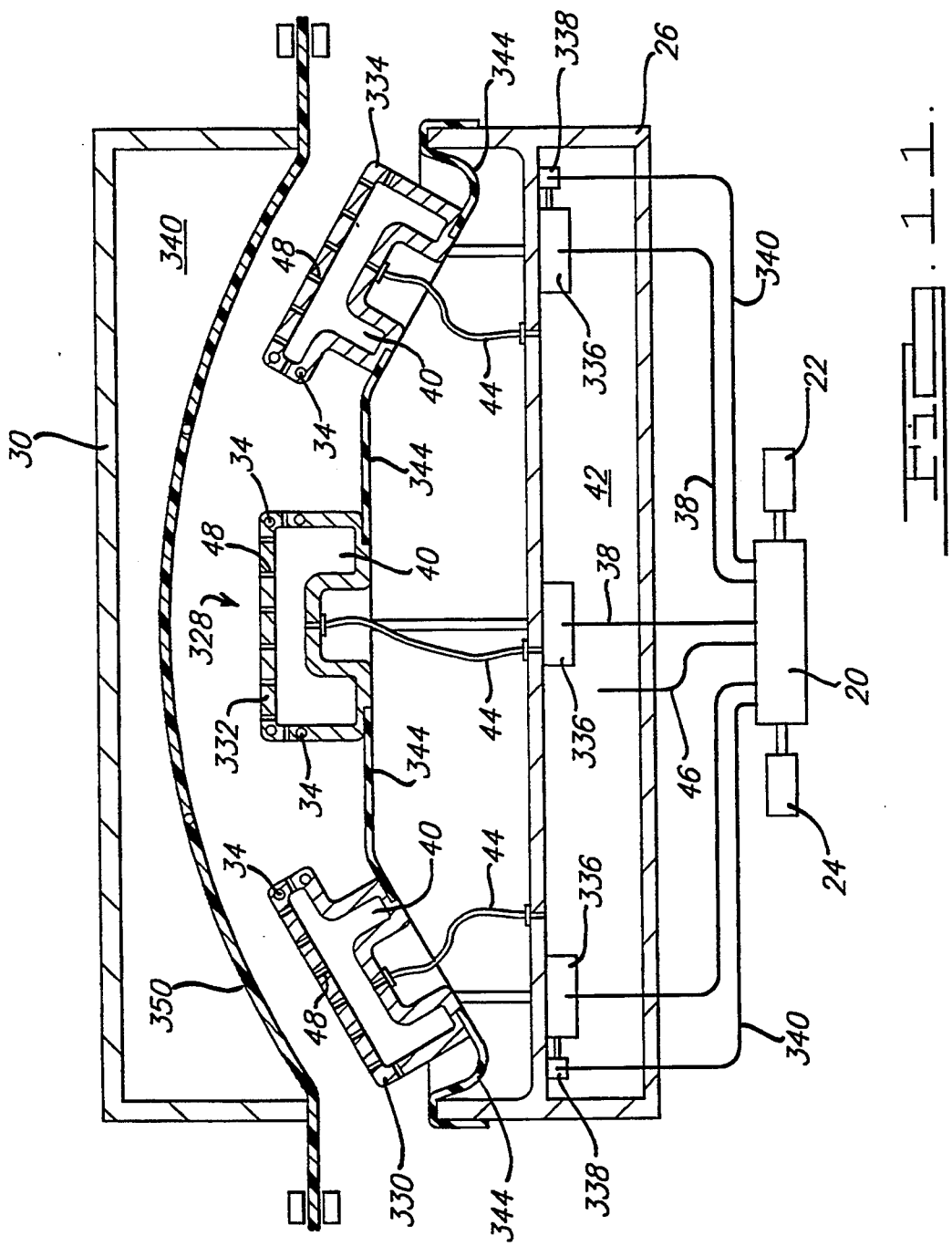

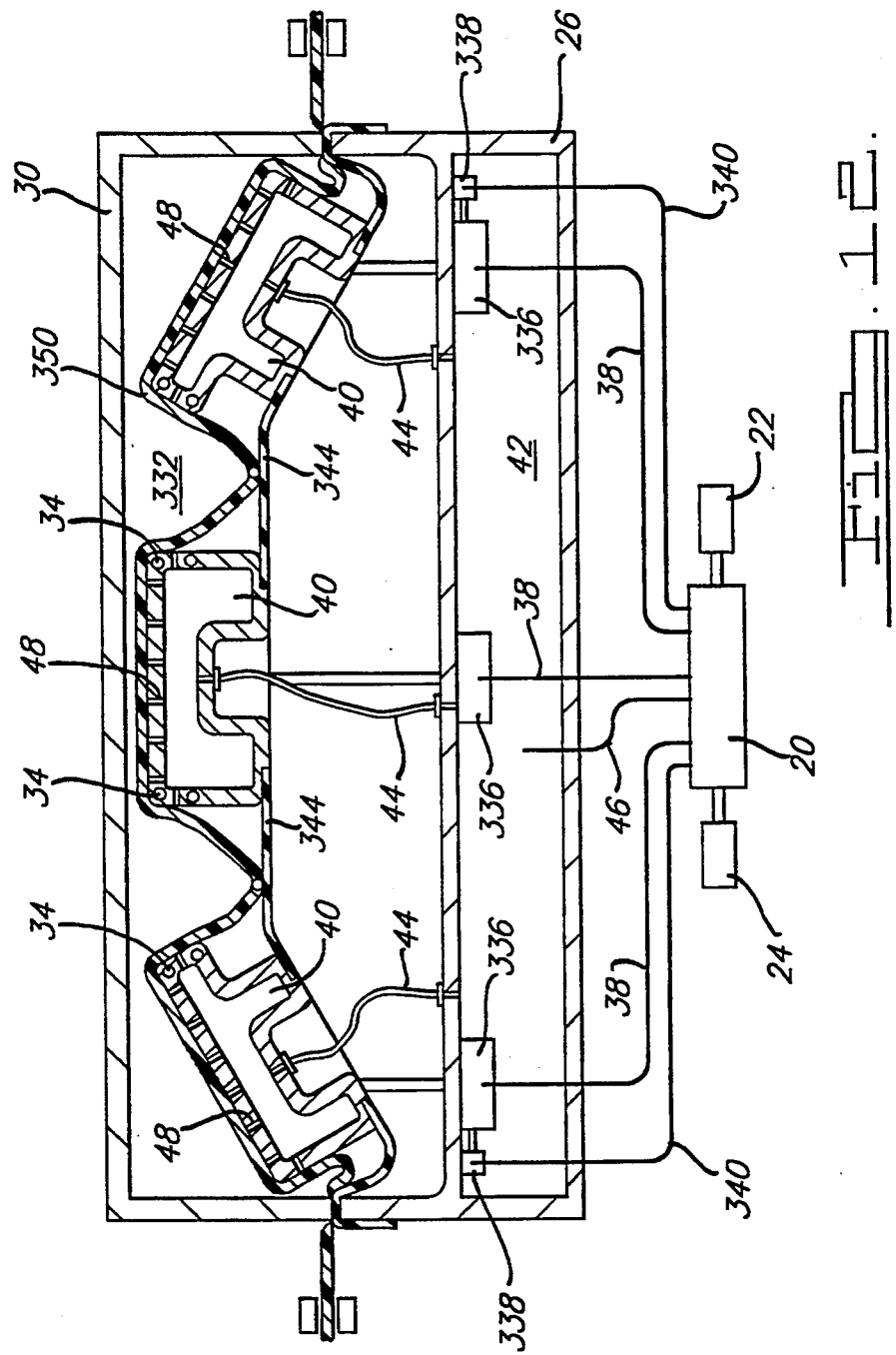

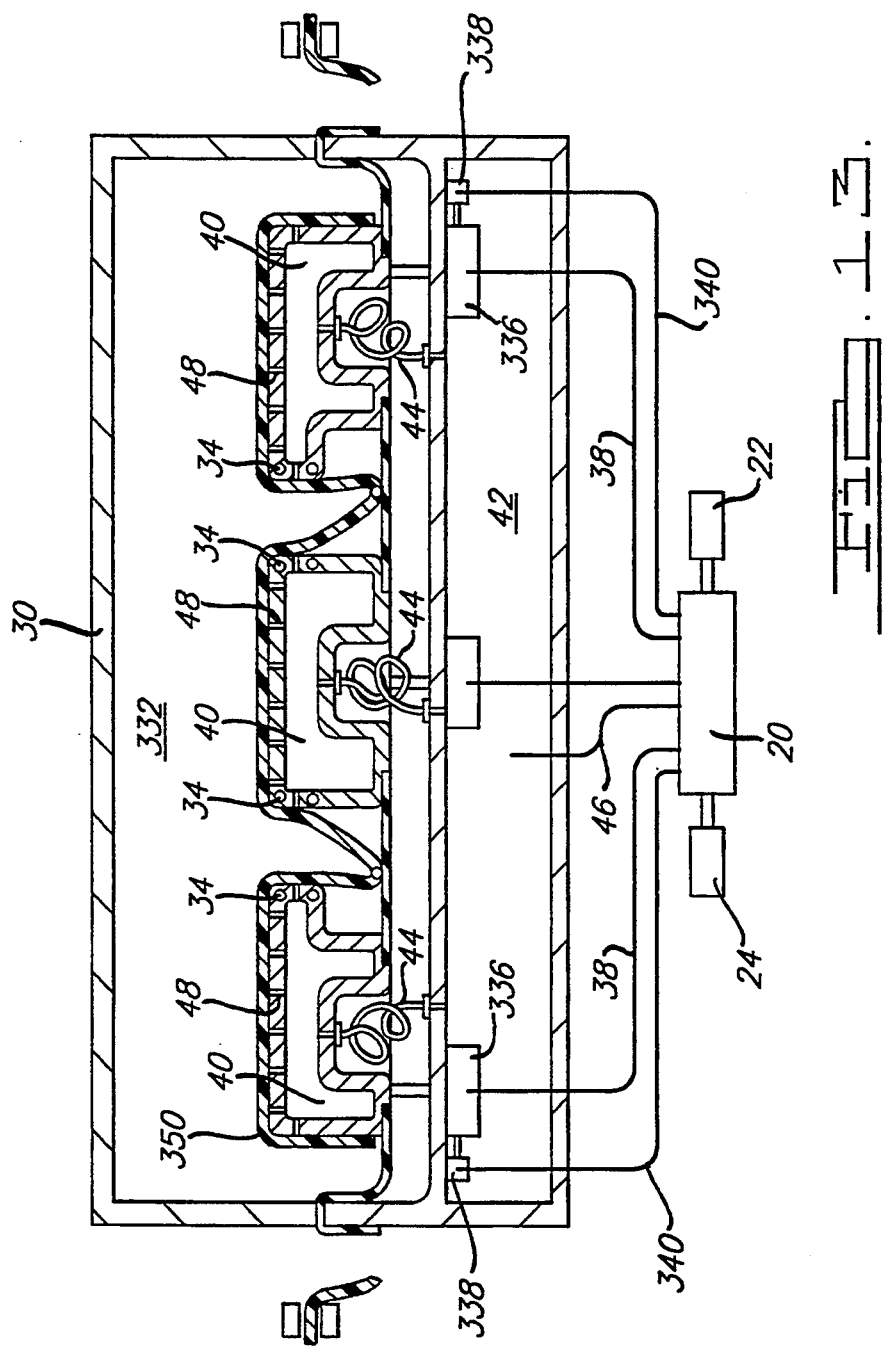

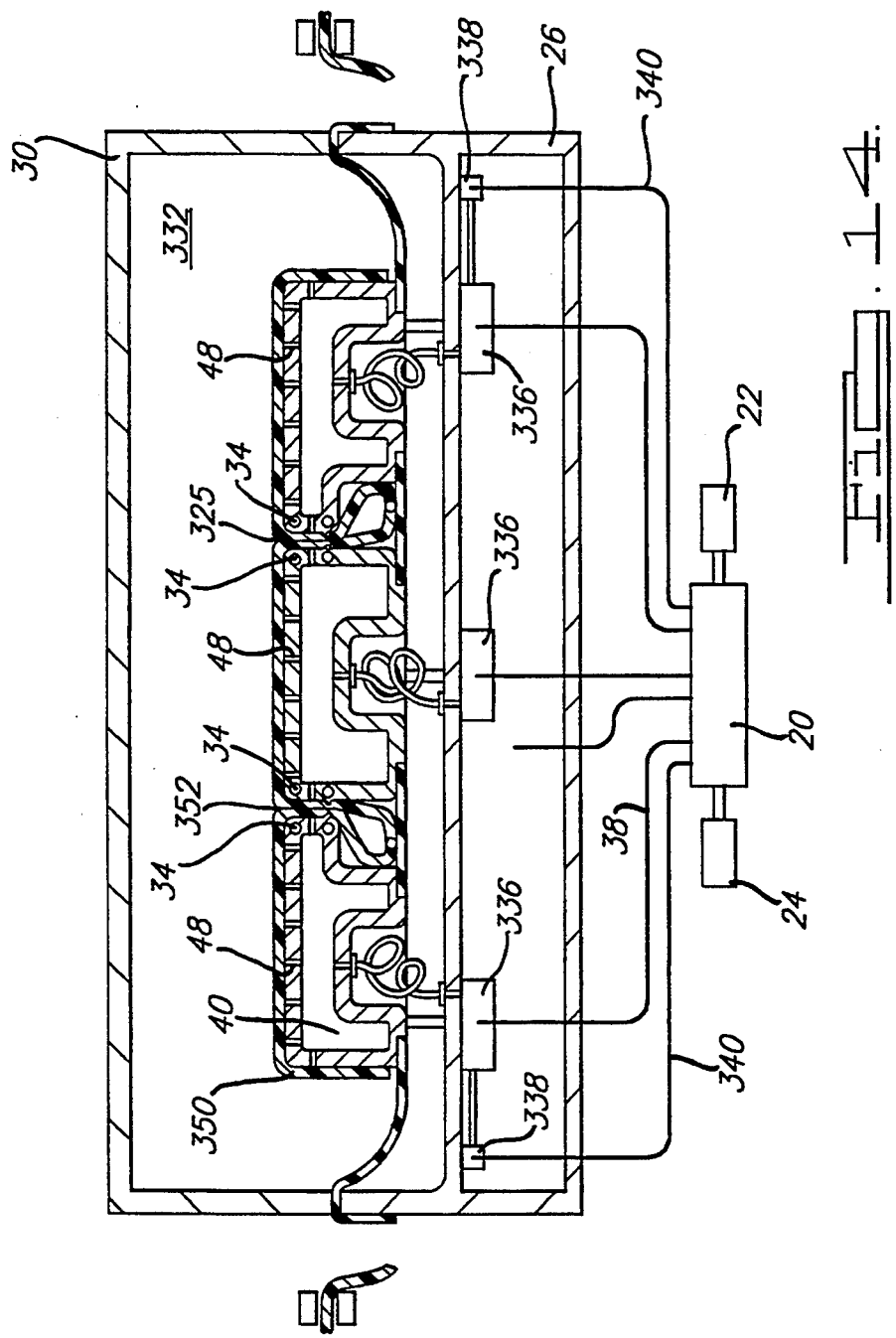

APPARATUS FOR MANUFACTURING MULTIPLE COLORED PLIABLE SOFT TRIM COMPONENTS USING MOVABLE DIES

Field of the Invention

The present invention relates to a vacuum forming method. More particularly, the present invention relates to a method of vacuum forming a one piece component comprising a plurality of different colored materials.

BACKGROUND OF THE INVENTION

It is well known in the art to use vacuum forming for the manufacture of three-dimensional trim panels, for example automobile door trim panels. When it is desired to have a multiple colored trim panel, individual trim pieces are manufactured, each trim piece being manufactured from a different color material. These individual pieces are then assembled into a finished trim panel by various methods known in the art.

One method of assembling multi-colored trim panels is to assemble the individual trim pieces onto the finished frame work or structure designed to properly position the individual pieces. For an automobile door trim panel, this would be the door frame. The assembly of the individual trim pieces themselves can either properly position each colored piece with respect to the other colored pieces or the attachment method being used can attach two adjacent colored pieces thus properly positioning both of them. This method is time consuming, expensive and provides a finish panel or door trim with a wide variability in the mating lines of the various trim pieces due to the variability of each of the individual components as the tolerances of the individual components are additive.

Another method which is often used is to pre-assemble the complete panel prior to assembling the panel onto the finished frame work or structure. In this method, the individual trim pieces are attached to each other by gluing, bonding, mechanical fasteners other methods well known in the art. These preassembled pieces are then assembled or fastened to the appropriate finished frame work or structure. While this method reduces somewhat the variability of the first method mentioned above, it is still a time consuming and expensive operation.

Accordingly, what is needed is a method of manufacturing a multi-colored trim panel which is reliable, inexpensive and capable of producing a high quality component having a minimum of variability in the mating line of the various trim pieces.

SUMMARY OF THE INVENTION

The present invention provides the art with a method of vacuum forming a multi-colored one piece trim panel which uses a multi-piece movable die set which first vacuum forms the individual colored components on separate dies. The dies are then moved together to seam bond the individual trim pieces to each other during the forming process. The finished component is a multi-colored one piece trim panel. The seam bonding of the individual pieces insures a minimum of variability in the mating line of the individual trim pieces.

Other advantages and objects of the present invention will become apparent to those skilled in the art from the subsequent detailed description, appended claims and drawings.

DESCRIPTION OF THE DRAWINGS

In the drawings which illustrate the best mode presently contemplated for carrying out the present invention:

FIG. 1 is a side view partially in cross section of a movable die set in accordance with the present invention;

FIG. 2 is a side view partially in cross section of the die set in FIG. 1 after the vacuum forming step has been performed;

FIG. 3 is a side view partially in cross section of the die set in FIG. 1 after the dies have been closed to complete the seam bonding of the components;

FIG. 7 is a side view partially in cross section of the die set in accordance with another embodiment of the present invention;

FIG. 8 is a side view partially in cross section of the die set of FIG. 7 after the vacuum forming operation;

FIG. 11 is a side view partially in cross section of a die set in accordance with a another embodiment of the present invention;

FIG. 12 is a side view partially in cross section of the die set of FIG. 11 after the vacuum forming operation;

FIG. 13 is a side of FIG. 11 after vacuum forming before seam bonding; and

FIG. 14 is a side of FIG. 11 after seam bonding.

DETAILED DESCRIPTION OF THE INVENTION

Figure 4:
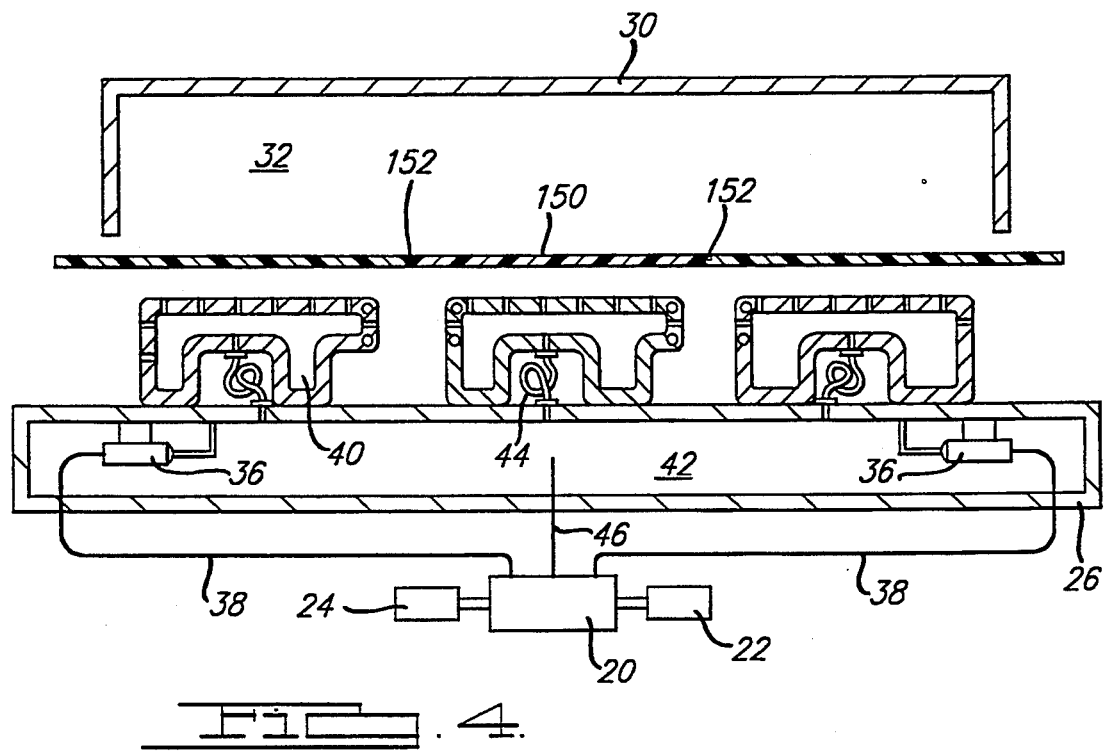
FIG. 4 is similar to FIG. 1 except using a pre-seamed multi-colored sheet of material.

Referring now to the drawings in which like reference numerals designate like or corresponding parts throughout the several views, there is shown in FIGS. 1 through 3 a method and apparatus for vacuum forming a multiple colored soft trim component. The method and apparatus described in the present invention are applicable to any type of vacuum formable plastic. This includes, but is not limited to, materials such as vinyl, TPO/TPE, Urithene A.B.S./PVC and any alloys of the above mentioned plastics.

FIG. 1 shows a vacuum forming apparatus for use with the present invention and is designated by the reference numeral 10. Vacuum forming apparatus 10 comprises a program control apparatus 20, a source of vacuum 22, a source of hydraulic pressure 24, a base 26, a three section set of movable dies 28, and a three section set of movable upper platens 30. The base 26 and each of the three movable platens 30 form a mold cavity 32 when each of the three movable platens 30 are positioned over a respective die as shown in FIG. 2.

Each die of the set of movable dies 28 is disposed on the upper portion of base 26 and two of the three dies 28 are movable with respect to base 26. In the embodiment shown in FIG. 1 through 3, the center die section is fixed to base 26 while the die sections to either side are movable with respect to the center die section. The two side die sections are movable from an open position as shown in FIG. 1 to a closed position as shown in FIG. 3 by hydraulic actuators 36. Hydraulic actuators 36 are fixed to base 26 and are in communication with control apparatus 20 by hydraulic lines 38 as will be described later herein. While the embodiment shown in FIGS. 1 through 3 has three die sections with the center die section being fixed and the side die sections being movable, it is well within the scope of the present invention to have more or less than three die sections and allow any or all of the die sections to be movable with respect to the other die sections.

Each die section of die set 28 defines a vacuum chamber 40. Vacuum chambers 40 are in communication with an internal cavity 42 within base 26 by vacuum lines 44. Cavity 42 within base 26 is in communication with control apparatus 20 by vacuum line 46 which draws a vacuum in cavity 42 which in turn draws a vacuum in cavity 40 through vacuum lines 44. The top plate and side walls of each die section of die set 28 have a plurality of perforations 48 in the form of channels which connect vacuum chamber 40 to the respective mold cavity 32 formed by upper platen 30 and base 26. Each of the die sections of die set 28 also have an additional heating means 34 in the area where a seam will be formed as will be described later herein. Additional heating means 34 can be comprised of processes such as calrod, resistance wire strip, hot water or hot oil, electrical heat tape or other means well known in the art.

The three upper platens 30 are disposed above base 26 and die set 28 and each individual upper platen 30 forms the respective mold cavity 32 for each die in die set 28 as described above. Each of the three upper platens 30 contain a means for heating a respective plastic sheet 50 as will be described later herein.

During the operation of vacuum forming apparatus 10, the three plastic sheets 50 are each positioned between a respective upper platen 30 and die set 28. The three plastic sheets 50 can be of the same or different colors depending on the required application. Each of the upper platen 30 heats the individual sheets 50 until a predetermined forming temperature is reached. This forming temperature will vary according to the size and material of the plastic sheets 50. Forming temperatures can range from 200° F. for the thinner single layer vinyls to as high as 340° F. for the bilaminate TPO's.

Once the predetermined temperature of each of the three sheets 50 has been reached, the respective upper platen 30 moves horizontally and downward to seal off the respective mold cavity 32 and control apparatus 20 connects the source of vacuum 22 to the appropriate vacuum chamber 40 through vacuum line 44, cavity 42 and vacuum line 46. This vacuum forms the individual sheet 50 over the respective die in die set 28 by pulling the plastic sheet 50 to the individual die of die set 28 by action of the vacuum working through the plurality of perforations 48 as shown in FIG. 2. This vacuum pressure normally ranges from 29 to 31 inches of mercury but a minimum of 26 inches of mercury is preferred. When the vacuum forming operation is complete for one of the individual dies of die set 28, normally anywhere from 3 seconds to 2 minutes depending on the thickness and type of material, the individual upper platen 30 is retracted and the forming operation is performed on another die of die set 28 until all three plastic sheets 50 have been formed. The horizontal movement of the upper platens 30 is depicted in dashed lines in FIG. 1. Once all three plastic sheets have been formed, control apparatus 20 provides hydraulic pressure from the source of hydraulic pressure 24 to hydraulic actuators 36 through hydraulic lines 38. Hydraulic actuators 36 close the die set 28 as shown in FIG. 3 and form the seam areas 52. In order to guarantee a complete bond, seam areas 52 are heated to maintain forming temperature by heating means 34.

Upon completion of the seam bond, the material is allowed to cool, the vacuum pressure is released and the hydraulic pressure is released by control apparatus 20. Typically, the plastic material should be allowed to cool to between 140° F. and 160° F. to insure dimensional stability. The finished multi-colored component is then removed from die set 28 and die set 28 is returned to its original position as shown in FIG. 1 to begin another cycle. In order to assist removal of the finished multi-colored component from die set 28, control apparatus 20 can momentarily provide a positive pressure to cavity 42 which will in turn pressurize chamber 40 through lines 44 and blow the finished component off of die set 28 through perforations 48. Normally this positive pressure would be a 1 to 2 second pulse of pressure which would range from 25 PSIG to 90 PSIG depending on the material thickness and type.

Figure 5:
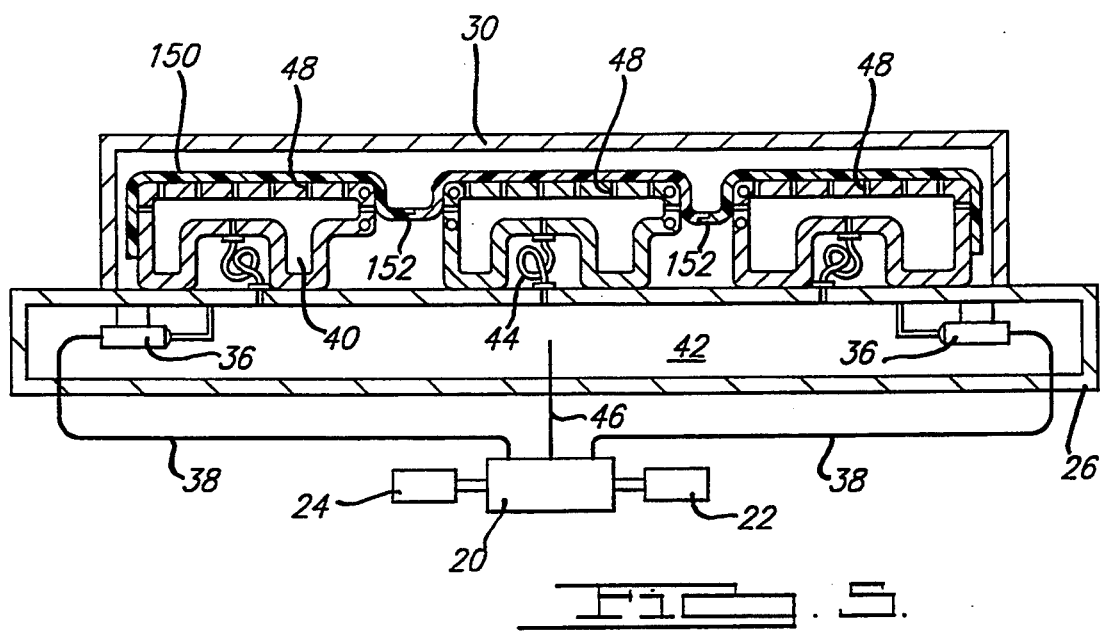
FIG. 5 is similar to FIG. 2 except using a pre-seamed multi-colored sheet of material.
Figure 6:
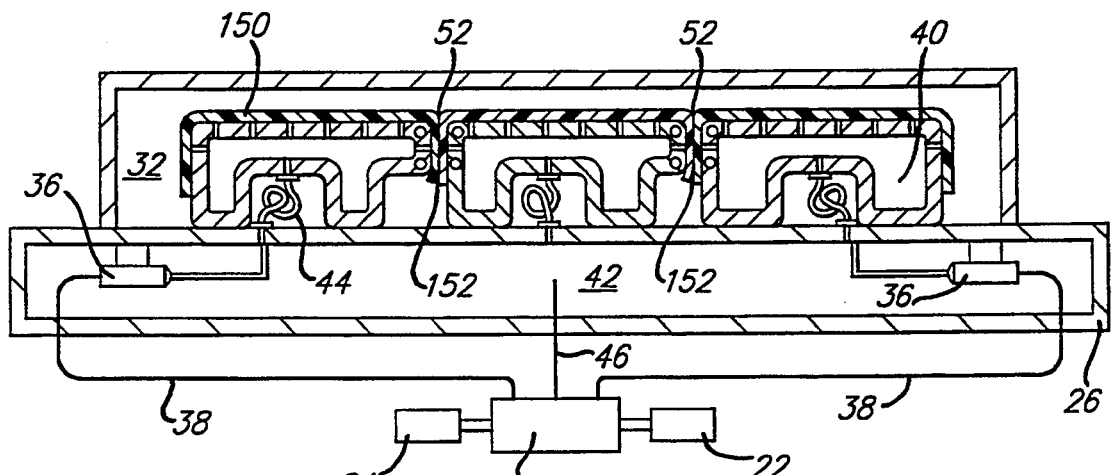
FIG. 6 is similar to FIG. 3 except using a pre-seamed multi-colored sheet of material.

FIGS. 4 through 6 show another embodiment of the present invention. This embodiment is identical to the embodiment shown in FIGS. 1 through 3 with the exception of the three plastic sheets 50. In this embodiment one plastic sheet 150 comprises a preseamed sheet of the required materials. The die set 28 is designed such that the seam areas 52 of the die set 28 line up with the seams 152 of the preseamed material 150 such that the sheet forms a loop between dies. After the vacuum forming operation, the original seams 152 are located in the seam area 52 of the finish component. The operation of the vacuum forming apparatus is identical to that described for FIGS. 1 through 3.

Figure 5A:
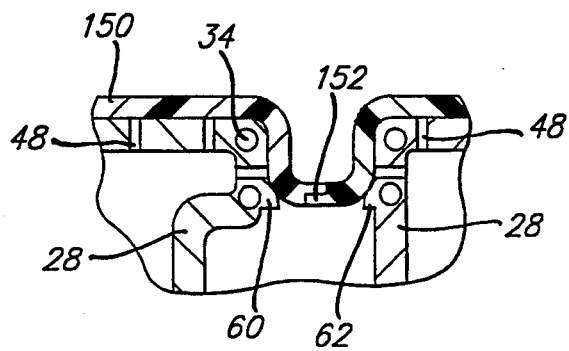
FIG. 5A is an enlarged view of the interface area of the movable and stationary die showing the optional cut off feature of the die set in the open position.
Figure 6A:
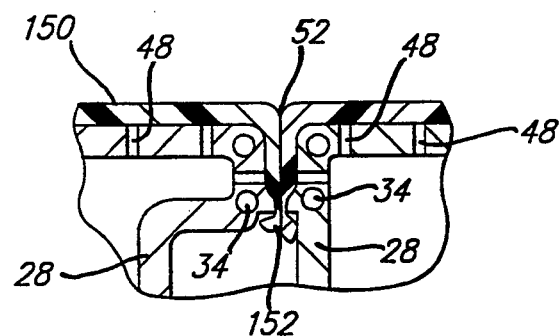
FIG. 6A is an enlarged view of the interface area of the movable and stationary die showing the optional cut off feature of the die set in the closed position.
Figure 9:
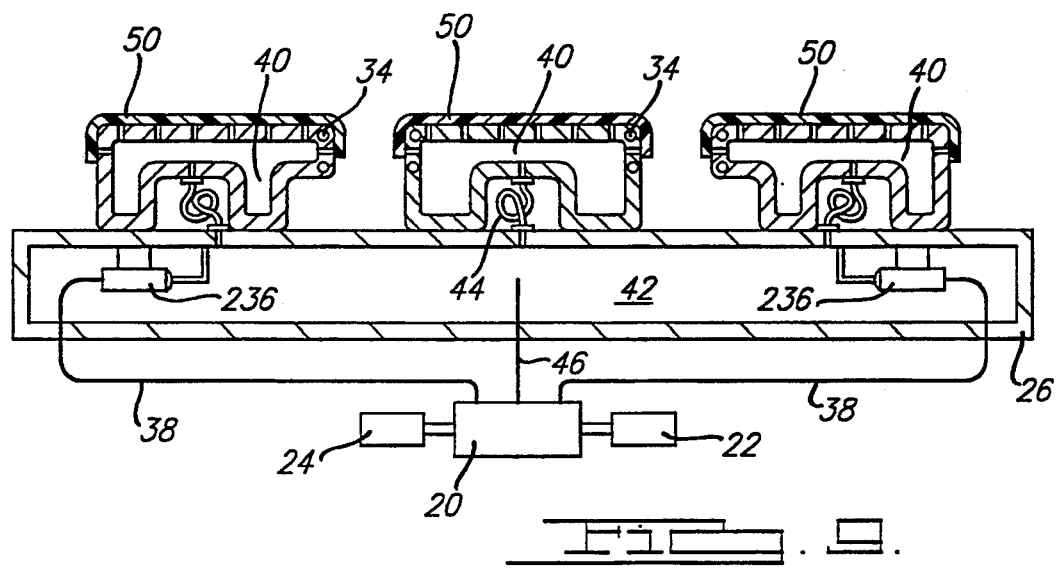
FIG. 9 is a side view partially in cross section of the die set of FIG. 7 after the vacuum forming operation and prior to the seam bonding operation.

FIGS. 5A and 6A illustrate an optional addition to the individual dies of die sets 28. The movable die of die set 28 has a longitudinally extending ridge 60 extending from the side of the movable die adjacent the fixed center die in the interface area between the two dies. The fixed die of die set 28 has a longitudinally extending ridge 62 corresponding to ridge 60. Ridge 62 extends from the side of the fixed die adjacent the movable die. When the material is vacuum formed as shown in FIG. 5, a portion of the plastic material is formed within this interface area as shown in FIG. 5A. Upon the closing of the die set, the ridges 60 and 62 effectively cut the material as shown in FIG. 6A. The excess strip of material left by the cutting operation can easily be stripped away by the operator of vacuum forming apparatus 10. While the cutoff feature has been shown incorporated in the die sets shown in FIGS. 4 through 6, similar cutoff features can be provided on any or all of the embodiments described herein.

FIGS. 7 through 10 show another embodiment of the present invention. In this embodiment, the die set 228 is composed of three die sections 230, 232 and 234. Center die section 232 is fixed to base 26. Side die sections 230 and 234 are movable along base 26 with respect to die section 232. The side die sections 230 and 234 travel in both a linear and an angular motion with respect to base 26.

The operation of the embodiment shown in FIGS. 7 through 10 begins with die sections 230, 232 and 234 positioned on the upper portion of base 26. For this embodiment there is no upper platen 30, as shown in FIG. 7. The three individual sheets of material 50 are first positioned away from die set 228 at a heating station. Once the individual sheets of material are heated to the proper temperature, a shuttle mechanism moves them into the position shown in FIG. 7. Each of the die sections 230, 232 and 234 define vacuum chamber 40. Vacuum chambers 40 are in communication with internal cavity 42 within base 26 by vacuum lines 44. Cavity 42 within base 26 is in communication with control apparatus 20 by vacuum line 46. The top plate and side walls of each die section 230, 232 and 234 have a plurality of perforations 48 in the form of channels which connect vacuum chamber 40 to the upper area surrounding die set 228. Each of the die sections 230, 232 and 234 also have additional heating means 34 in the area where the seam will be formed. The three sheets of material 50 are heated until a predetermined forming temperature is reached, similar to the heating in the description of FIGS. 1 through 3. As mentioned above, this heating operation is conducted adjacent to the die set 228 and the heated sheets of material 50 are shuttled to the forming area once the proper temperature is reached by means known well in the art.

Figure 10:
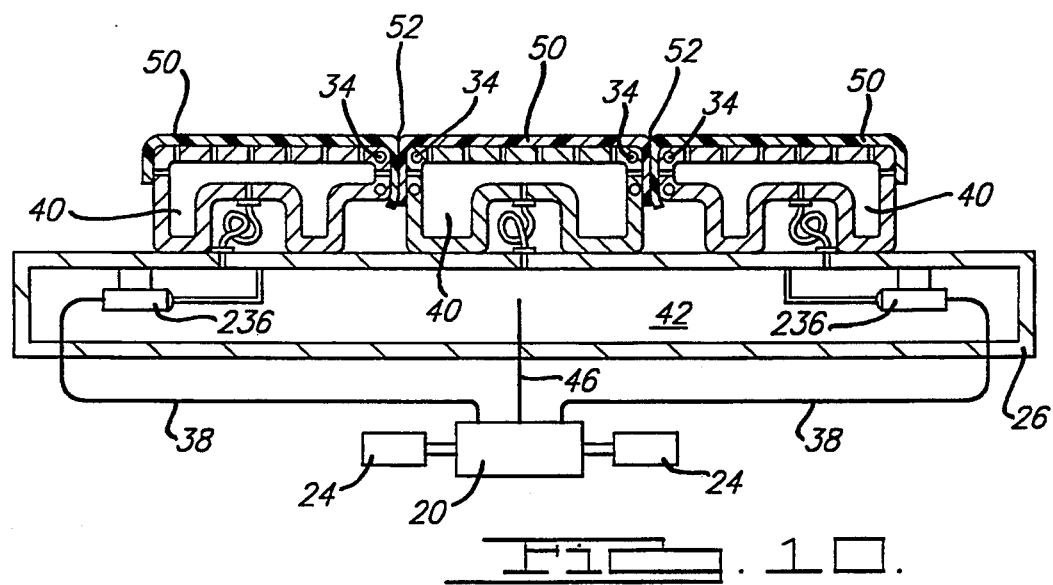
FIG. 10 is a side view partially in cross section of the die set of FIG. 7 after the seam bonding operation.

Once the predetermined temperature of the three sheets 50 has been reached and the three sheets 50 have been shuttled into position, the control apparatus 20 connects the source of vacuum 22 to the vacuum chambers 40 through vacuum lines 44, cavity 42 and vacuum line 46. This vacuum forms the three sheets 50 over each die section 230, 232 and 234 by pulling the plastic sheets 50 to the die sections 230, 232 and 234 by action of the vacuum working through the plurality of perforations 48 as shown in FIG. 8. When the vacuum forming operation is complete, control apparatus 20 provides hydraulic pressure from the source of hydraulic pressure 24 to the hydraulic actuators 236 through hydraulic lines 38. Hydraulic actuators 236 first rotate the die sections 230 and 234 to the position shown in FIG. 9. Hydraulic actuators 236 then continue their operation and close die set 228 as shown in FIG. 10 and form seam areas 52. In order to guarantee a complete bond, seam areas 52 are heated to maintain forming temperature by heating means 34 as described in FIGS. 1 through 3.

Upon completion of the seam bond, the material is allowed to cool, the vacuum pressure is released and the hydraulic pressure is released by control apparatus 20. Typical temperatures for cooling are the same as presented for the method shown in FIGS. 1 through 3. The finished multi-colored component is removed from die cavity 32 and die set 228 is returned to its original positions as shown in FIG. 7 to begin another cycle. Again, momentary pressure can be provided to cavity 42 to blow the finished component off the mold, similar to that described for FIGS. 1 through 3.

Another embodiment of the present invention is shown in FIGS. 11 through 14. This embodiment utilizes a preseamed multi-colored sheet of plastic 350 and a set of movable dies 328 having three individual dies 330, 332 and 334. In this embodiment, all three of die sections 330, 332, and 334 are movable with respect to the base 26 in both a horizontal and vertical direction. Die sections 330, 332 and 334 are similar to the die sections described in the previous embodiments. They each have a vacuum chamber 40 and a plurality of perforations 48. Additional heating means 34 is also provided for die sections 330, 332 and 334.

The operation begins with the dies positioned as shown in FIG. 11. A preseamed multi-colored sheet of plastic 350 is positioned above die set 328 and below the upper platen 30. Upper platen 30 heats the sheet plastic 350 to a predetermined temperature similar to temperatures mentioned above. Upper platen 30 is then moved to make contact with plastic sheet 350 and form chamber 340. Control apparatus 20 can then draw a vacuum in chamber 340 formed by plastic sheet 350 and upper platen 30 through a vacuum line (not shown) and cause plastic sheet 350 into the configuration shown in FIG. 11. Once the predetermined temperature is reached, upper platen 30 moves downward or base 26 moves upward and, if required, a vacuum is drawn in chamber 340, control apparatus 20 then connects the source of vacuum 22 to vacuum chambers 40 through vacuum lines 44, cavity 42 and vacuum line 46. This vacuum forms the preseamed sheet 350 over each die in die set 328 by pulling the plastic sheet 350 to die sections 330, 332 and 334 by action of the vacuum working through the plurality of perforations 48 as shown in FIG. 12. On some applications it may become necessary to also have control apparatus 20 provide a positive pressure to chamber 332 to enhance the forming of plastic sheet 350. A flexible bladder 344 is attached to base 26 and die sections 330, 332 and 334 as shown in FIGS. 11 through 14. Flexible bladder 344 insures that the material of sheet plastic 350 which is located in between die sections 330, 332 and 334 does not sag below the die sections and interfere with their movement during the forming operation. Control apparatus 20 then provides hydraulic pressure from the source of hydraulic pressure 24 to the hydraulic actuators 336 through hydraulic lines 38. Hydraulic actuators 336 lower and rotate die sections 330, 332 and 334 and position them as shown in FIG. 13. In addition to moving die sections 330, 332 and 334, base 26 may also be provided with vertical motion to achieve the position shown in FIG. 13. Control apparatus 20 then provides hydraulic pressure from the source of hydraulic pressure 24 to the hydraulic actuators 338 through hydraulic lines 340. Hydraulic actuators 338 close the die set 328 as shown in FIG. 14 creating seam area 352. In order to guarantee a complete bond, seam area 352 is heated to maintain forming temperatures by heating means 34 as described for FIGS. 1 through 3.

Upon completion of the seam bond, the material is allowed to cool, upper platen 30 is raised, the vacuum pressure is released and the hydraulic pressure is released by control apparatus 20. The material is allowed to cool to the temperatures mentioned above. The finished multi-colored component is removed from the die cavity and the die set 328 is returned to its original positions as shown in FIG. 11 to begin another cycle. Again, momentary pressure can be provided to cavity 42 to blow the finished component off of the mold.

While the above detailed description describes the preferred embodiment of the present invention, it should be understood that the present invention is susceptible to modification, variation and alteration without deviating from the scope and fair meaning of the subjoined claims.

What is claimed is:

1. A vacuum forming mold for molding a single layered, generally planar single piece panel from a plurality of generally planar plastic sheets, said mold comprising:
   a base;
   a plurality of dies disposed upon said base, at least one of said plurality of dies being movable with respect to another of said plurality of dies;
   means for heating said plurality of plastic sheets to a temperature at which said plurality of sheets are in a formable state;
   means for positioning each of said plurality of plastic sheets on a respective die of said plurality of dies;
   means for applying a negative pressure through each of said dies, said negative pressure being of sufficient degree and applied in a manner whereby a attractive force is transmitted through each of said dies and attracts each of said plastic sheets onto said respective die;
   means for moving said at least one of said plurality of dies adjacent said another of said plurality of dies;
   and means for seam bonding said plurality of plastic sheets to form said single layered, generally planar single piece panel.

2. The vacuum forming mold of claim 1 further comprising means for supplying additional heat in the adjacent areas of said plurality of dies.

3. The vacuum forming mold of claim 1 wherein said dies are movable in both an angular and linear direction.

4. The vacuum forming mold of claim 1 further comprising means for trimming excess material from said plurality of plastic sheets, said trimming means disposed between adjacent dies of said plurality of dies.

5. A vacuum forming mold for molding a single layered, generally planar single piece panel from a single plastic generally planar sheet, said mold comprising:
   a base;
   a plurality of dies disposed upon said base, at least one of said plurality of dies being movable with respect to another of said plurality of dies;
   means for heating said single plastic sheet to a temperature at which said single plastic sheet is in a formable state;
   means for positioning said single plastic sheet on said plurality of dies such that said single plastic sheet forms loops between said dies;
   means for applying a negative pressure through each of said dies, said negative pressure being of sufficient degree and applied in a manner whereby a attractive force is transmitted through each of said dies and attracts said single plastic sheet onto said plurality of dies;
   means for moving said at least one of said plurality of dies adjacent said another of said plurality of dies;
   and means for seam bonding said loops to form said single layered, generally planar single piece panel.

6. The vacuum forming mold of claim 5 further comprising means for supplying additional heat in the adjacent areas of said plurality of dies.

7. The vacuum forming mold of claim 5 wherein said dies are movable in both an angular and linear direction.

8. The vacuum forming mold of claim 5 further comprising means for trimming excess material from said plurality of plastic sheets, said trimming means disposed between adjacent dies of said plurality of dies.

9. A vacuum forming mold for molding a single piece panel from a plurality of plastic sheets said mold comprising:
   a base;
   a plurality of dies disposed upon said base, at least one of said plurality of dies being movable with respect to another of said plurality of dies;
   means for heating said plurality of plastic sheets to a temperature at which said plurality of sheets are in a formable state;
   means for positioning each of said plurality of plastic sheets on a respective die of said plurality of dies;
   means for applying a negative pressure through each of said dies, said negative pressure being of sufficient degree and applied in a manner whereby a attractive force is transmitted through each of said dies and attracts each of said plastic sheets onto said respective die;
   means for moving said at least one of said plurality of dies adjacent said another of said plurality of dies;
   means for seam bonding said plurality of plastic sheets to form said single layered, generally planar single piece panel; and
   wherein said means for seam bonding includes means for supplying additional heat in the adjacent areas of said plurality of dies, said means for supplying additional heat being disposed within at least one of said plurality of dies.

10. The vacuum forming mold of claim 9 wherein said dies are movable in both an angular and linear direction.

11. The vacuum forming mold of claim 9 further comprising means for trimming excess material from said plurality of plastic sheets, said trimming means disposed between adjacent dies of said plurality of dies.

12. A vacuum forming mold for molding a single piece panel from a single plastic sheet said mold comprising:
   a base;
   a plurality of dies disposed upon said base, at least one of said plurality of dies being movable with respect to another of said plurality of dies;
   means for heating said single plastic sheet to a temperature at which said single plastic sheet is in a formable state;
   means for positioning said single plastic sheet on said plurality of dies such that said single plastic sheet forms loops between said dies;
   means for applying a negative pressure through each of said dies, said negative pressure being of sufficient degree and applied in a manner whereby a attractive force is transmitted through each of said dies and attracts said plastic sheet onto said plurality of dies;
   means for moving said at least one of said plurality of dies adjacent said another of said plurality of dies;
   means for seam bonding said loops to form said single piece panel; and
   wherein said means for seam bonding includes means for supplying additional heat in the adjacent areas of said plurality of dies, said means for supplying additional heat being disposed within at least one of said plurality of dies.

13. The vacuum forming mold of claim 12 wherein said dies are movable in both an angular and linear direction.

14. The vacuum forming mold of claim 12 further comprising means for trimming excess material from said plurality of plastic sheets, said trimming means disposed between adjacent dies of said plurality of dies.

* * * * *